(12) United States Patent
Schulze

(10) Patent No.: US 9,454,212 B1
(45) Date of Patent: Sep. 27, 2016

(54) WAKEUP DETECTOR

(71) Applicant: Western Digital Technologies, Inc., Irvine, CA (US)

(72) Inventor: Martin E. Schulze, Longmont, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 120 days.

(21) Appl. No.: 14/563,633

(22) Filed: Dec. 8, 2014

(51) Int. Cl.
 G06F 1/26 (2006.01)
 G06F 1/32 (2006.01)
 G06F 1/12 (2006.01)

(52) U.S. Cl.
 CPC .............. *G06F 1/324* (2013.01); *G06F 1/12* (2013.01); *G06F 1/3293* (2013.01)

(58) Field of Classification Search
 CPC ......... G06F 1/12; G06F 1/324; G06F 1/3293
 USPC .................................................. 713/300, 320
 See application file for complete search history.

(56) References Cited

U.S. PATENT DOCUMENTS

| | | | |
|---|---|---|---|
| 6,014,283 | A | 1/2000 | Codilian et al. |
| 6,047,380 | A | 4/2000 | Nolan et al. |
| 6,052,076 | A | 4/2000 | Patton, III et al. |
| 6,052,250 | A | 4/2000 | Golowka et al. |
| 6,067,206 | A | 5/2000 | Hull et al. |
| 6,078,453 | A | 6/2000 | Dziallo et al. |
| 6,091,564 | A | 7/2000 | Codilian et al. |
| 6,094,020 | A | 7/2000 | Goretzki et al. |
| 6,101,065 | A | 8/2000 | Alfred et al. |
| 6,104,153 | A | 8/2000 | Codilian et al. |
| 6,122,133 | A | 9/2000 | Nazarian et al. |
| 6,122,135 | A | 9/2000 | Stich |
| 6,141,175 | A | 10/2000 | Nazarian et al. |
| 6,160,368 | A | 12/2000 | Plutowski |
| 6,181,502 | B1 | 1/2001 | Hussein et al. |
| 6,195,222 | B1 | 2/2001 | Heminger et al. |
| 6,198,584 | B1 | 3/2001 | Codilian et al. |
| 6,198,590 | B1 | 3/2001 | Codilian et al. |
| 6,204,988 | B1 | 3/2001 | Codilian et al. |
| 6,243,223 | B1 | 6/2001 | Elliott et al. |
| 6,281,652 | B1 | 8/2001 | Ryan et al. |
| 6,285,521 | B1 | 9/2001 | Hussein |
| 6,292,320 | B1 | 9/2001 | Mason et al. |
| 6,310,742 | B1 | 10/2001 | Nazarian et al. |

(Continued)

FOREIGN PATENT DOCUMENTS

WO  9820609  5/1998

*Primary Examiner* — Mark Connolly
(74) *Attorney, Agent, or Firm* — Brownstein Hyatt Farber Schreck, LLP

(57) ABSTRACT

Systems and methods related to wakeup circuits for electronic devices are disclosed. More particularly, an electronic device includes a component operable in at least a lower power state and a higher power state and a wakeup circuit configured to signal the component to transition from the lower power state to the higher power state upon declaration of a wakeup event. The wakeup circuit is configured to process a received input signal to synchronize with a clock; generate an activity signal that includes an activity pulse for each time the processed input signal changes state in different cycles of the clock; open a qualification window upon detection of a first activity pulse in the activity signal; and in the event more than a threshold number of activity pulses in the activity signal are detected prior to closing the qualification window, declare a wakeup event.

24 Claims, 7 Drawing Sheets

(56) References Cited

U.S. PATENT DOCUMENTS

| | | |
|---|---|---|
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett et al. |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |

(56) References Cited

U.S. PATENT DOCUMENTS

| | | |
|---|---|---|
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 2004/0221187 A1* | 11/2004 | Durand .............. G06F 1/3203 713/300 |
| 2005/0143145 A1* | 6/2005 | Maekawa ............ G06F 1/3209 455/574 |
| 2009/0146721 A1 | 6/2009 | Kurooka et al. |
| 2009/0275302 A1 | 11/2009 | Huston et al. |
| 2010/0035085 A1 | 2/2010 | Jung et al. |
| 2010/0180136 A1* | 7/2010 | Thompson ............ G06F 1/3203 713/324 |
| 2011/0234417 A1* | 9/2011 | Aleman .................. G06F 1/14 |

(56) References Cited

U.S. PATENT DOCUMENTS

| | | |
|---|---|---|
| 2011/0312285 A1 | 12/2011 | Amir et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |
| 2014/0215246 A1* | 7/2014 | Lee ............ G06F 1/3206 340/660 713/323 |

* cited by examiner

WAKEUP DETECTOR

TECHNICAL FIELD

This disclosure relates to electronic devices and, more particularly, to wakeup detectors for electronic devices.

BACKGROUND

Many electronic devices, such as storage devices, attempt to manage power consumption and usage by utilizing various power management systems. For example, an electronic device may include a number of power states. Such multiple power states may include states such as a normal operating state (or higher power state) where power is provided to various components of the electronic device and a lower power state (lower as less power may be consumed than in the normal operating state) where power is not provided, or a lower amount of power is provided, to at least some of the components. The electronic device may operate in the normal power state when the components are used and in the lower power state when the components are not used, avoiding power wastage by providing power to currently unnecessary components.

When an electronic device operates in such a lower power state, it may determine when the components are to be used so that the state can then switch from the lower power state to the normal operating state. A wakeup circuit may monitor an input signal in which a wakeup signal may be represented. The wakeup circuit may utilize a clock to continuously and/or otherwise sample and analyze the received input signal to detect when a wakeup signal is present. Upon detection that a wakeup signal is present, the electronic device may switch from the lower power state to the normal operating state.

BRIEF DESCRIPTION OF THE DRAWINGS

Reference will now be made to representative embodiments illustrated in the accompanying figures. It should be understood that the following descriptions are not intended to limit the disclosure to one preferred embodiment. To the contrary, each is intended to cover alternatives, modifications, and equivalents as may be included within the spirit and scope of the described embodiments as defined by the appended claims.

The use of the same or similar reference numerals in different drawings indicates similar, related, or identical items where appropriate.

DETAILED DESCRIPTION

Figure 1:
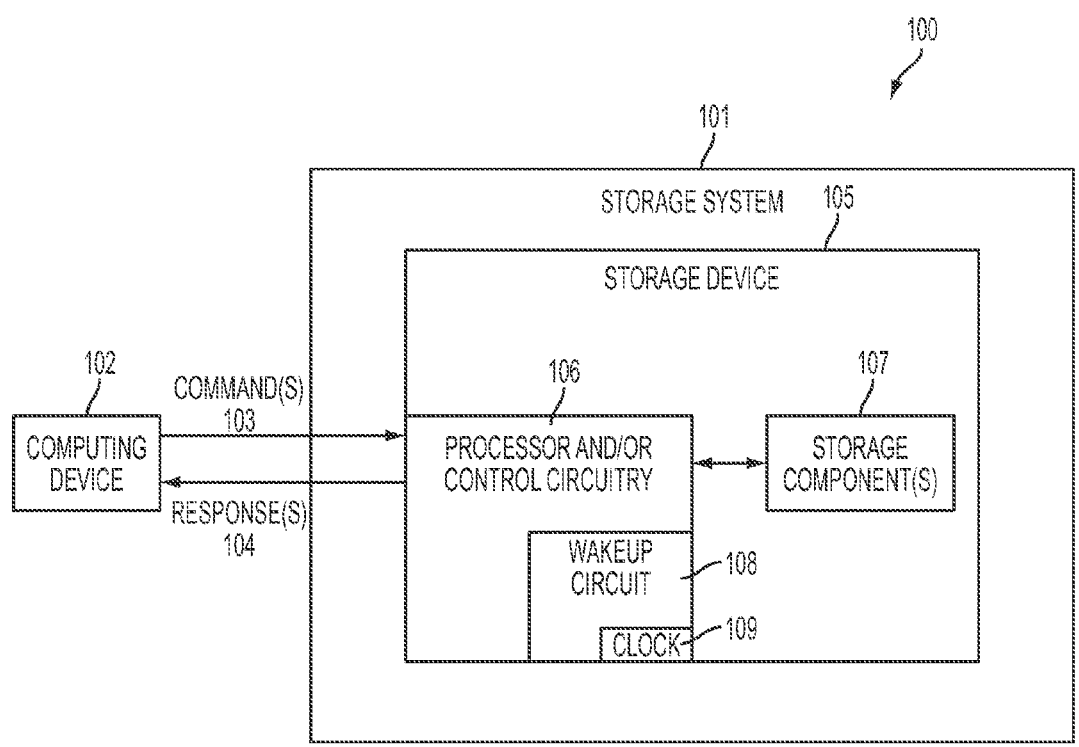
FIG. 1 depicts a simplified block diagram of a system with an example electronic device having a wakeup circuit.

Some embodiments described herein relate to systems and methods related to wakeup circuits for electronic devices. A wakeup circuit of an electronic device operating in a low power state may utilize a clock to sample and analyze an input signal that may include a wakeup signal. However, reliable frequency clocks such as crystal oscillators may be expensive and/or utilize more power than other clocks. Less expensive clocks and/or clock that utilize less power (such as ring oscillators) may not have a reliable frequency (variations in frequency may occur due to manufacturing, temperature and/or other conditions during operation, and so on) and/or may have lower frequencies than are suitable for sampling and analyzing the input signal.

For example, in the storage context, Serial Advanced Technology Attachment (SATA) out of band (OOB) sequence detection may utilize a differential signal detector that indicates whether differential signal is present (a burst is being received) or is not present (a space is being received). SATA phy macrocells may provide this function and the resulting output signal may be referred to as "sigdet," short for signal detect. An ideal signal detector circuit receiving a nominal SATA Comwake or Comreset (two of a number of different wakeup signals that may be utilized in SATA) may generate a sigdet output of six assertions where each assertion may be 106.666 nanoseconds long (representing the length of an OOB burst) and each negation may also be 106.666 nanoseconds long (representing a space). However, in practice signal detector circuits may have large duty cycle distortion such that burst timing and space timing may be 80-130 nanoseconds. Detection of such OOB sequences may be accomplished by asynchronous sampling followed by digital processing of the sampled signal. Fixed and known reliable clock frequencies of 30 MHz or faster may be used to process the sigdet waveform. However, in some low power SATA states, the only clock available for sampling and processing this waveform may be of a frequency between 7 and 29 MHz. Such a clock may be a low power ring oscillator. Using such a clock to sample the sigdet waveform may result in unreliable sampling, as there may be combinations of sigdet timing plus sample clock phase and frequency where spaces are sampled but bursts are missed or busts are sampled but spaces are missed. This may cause detection of Comwake or Comreset to be unreliable, which may be unacceptable for system operation.

A wakeup circuit for an electronic device may include a clock, a sampling circuit portion, and a qualification window portion. The sampling circuit portion of the wakeup circuit may synchronize a received input signal with the clock and generate an activity signal that includes an activity pulse for each state change in the synchronized input signal per cycle of the clock. In some implementations the sampling circuit portion may also reduce the frequency of the input signal prior to synchronization. The qualification window portion may open a qualification window upon detection of a first activity pulse in the activity signal and in the event that more than a threshold number of activity pulses in the activity signal are detected prior to closing the qualification window, declare a wakeup event. In various implementations, the qualification window may be closed if more than the threshold number of activity pulses are not detected within a period (such as a fixed period of time and/or clock cycles, a user and/or software specified period of time and/or clock cycles, a period of time and/or clock cycles based upon a current frequency of the clock, and so on).

In this way, the wakeup circuit may be able to sample and analyze the input signal using a clock that may have an unreliable and/or lower frequency than would otherwise be possible. The wakeup circuit may be able to utilize the clock if the frequency of the clock is within a minimum or maximum of a range of frequencies. Further, in this way the wakeup circuit may be able to ignore at least some noise in the input signal while still being able to detect a present wakeup signal.

Although particular embodiments are discussed herein, it should be appreciated that the various embodiments, as well as functionality, operation, components, and capabilities thereof may be combined with other elements as necessary. Any physical, functional, or operational discussion of any element or feature is not intended to be limited solely to a particular embodiment to the exclusion of others.

FIG. 1 depicts a simplified block diagram of a system with an example electronic device having a wakeup circuit. As illustrated, the system 100 may include one or more data storage systems 101, of which the storage device 105 (and/or other storage devices) is a part, that may be configured to communicate with one or more computing devices 102. The computing device may be any electronic device such as a laptop computer, desktop computer, server, cellular phone, tablet computer, and so on. In some embodiments, the computing device can be implemented as a system of individual electronic devices, for example, as a network of servers.

The computing device 102 may send commands 103 to the storage device 105. The commands may be any number of commands including, but not necessarily limited to, write commands, erase commands, and read commands. The storage device may include a processor and/or control circuitry 106 (such as a controller, an electrical circuit, an integrated circuit, instructions executed by a processor, and so on) and one or more storage components 107 (such as a circular recording disk made from a magnetic material onto and/or into which data can be recorded as patterns of magnetic polarity, integrated circuit solid-state memory assemblies onto and/or into which data can be recorded, and so on) that may persistently store data. The control circuitry may process the commands and may transmit one or more responses 104 to the computing device (such as in response to receiving a command, as part of executing a received command, and so on). For one example, if the computing device sends a read command, the storage device may send a response including the requested data.

The storage device 105 may be operable in a number of power states. Such power states may include states such as a normal operating state (or higher power state) where power is provided to the storage component 107 and a lower power state (lower as less power may be consumed than in the normal operating state) where power is not provided to the storage component. The storage device may include a wakeup circuit 108 that may be operable in the lower power state to determine when a wakeup signal is received in an input signal. Upon determining that the wakeup signal is received, the wakeup circuit may signal the storage device to transition from the lower power state to the normal power state and/or another higher power state.

The wakeup circuit 108 may include a clock 109. The clock may be an unreliable frequency clock and/or a relatively lower frequency clock (such as between 7 and 29 MHz) such as a ring oscillator. The wakeup circuit may synchronize a received input signal with the clock; generate an activity signal that includes an activity pulse for each state change in the synchronized input signal per cycle of the clock; open a qualification window upon detection of a first activity pulse in the activity signal; and in the event that more than a threshold number of activity pulses in the activity signal are detected prior to closing the qualification window, declare a wakeup event. Upon declaring the wakeup event, the wakeup circuit may signal the storage device 105 to transition from the lower power state to the normal power state and/or another higher power state.

In some implementations the wakeup circuit 108 may also reduce the frequency of the input signal prior to synchronization. This may be performed where a frequency of the input signal is such that utilizing the clock 109 to sample and analyze the input signal may result in missing state changes in the input signal.

In various implementations, the qualification window may be closed if more than the threshold number of activity pulses are not detected within a period. Such a period may be as a fixed period of time and/or clock cycles (such as 63 and/or another number of clock cycles), a user and/or software specified period of time and/or clock cycles, a period of time and/or clock cycles based upon a current frequency of the clock 109, and so on.

Figure 2:
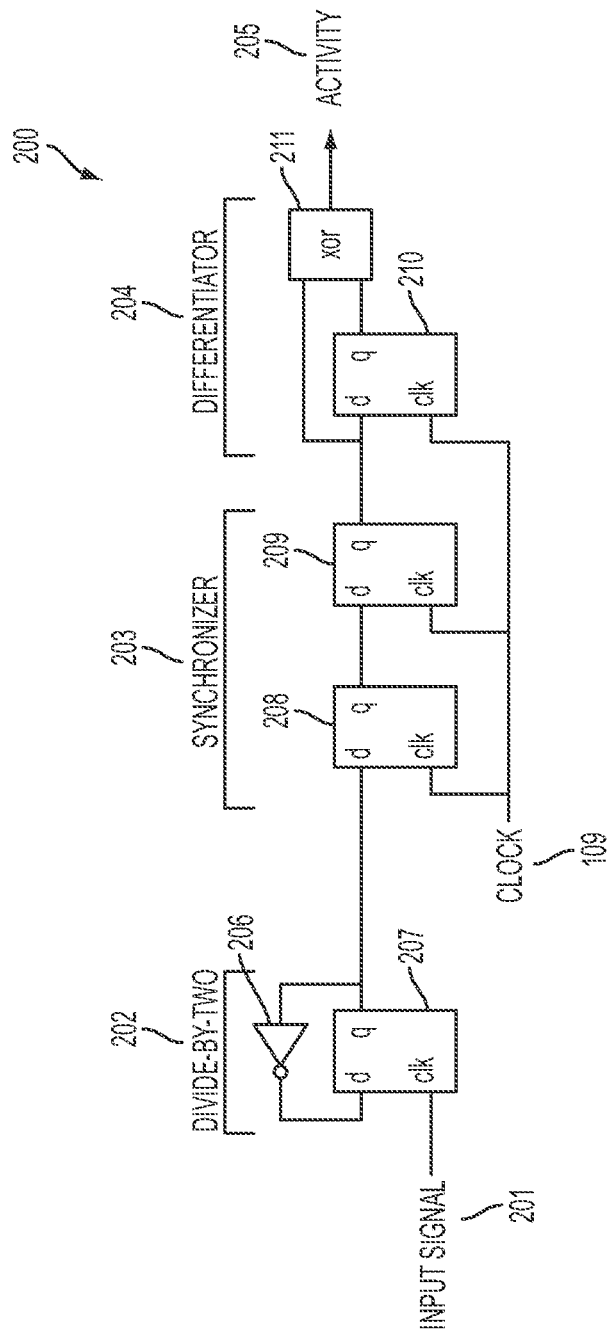
FIG. 2 depicts a simplified block diagram of an example sampling circuit of a wakeup circuit.

FIG. 2 depicts a simplified block diagram of an example sampling circuit 200 that may be used in the wakeup circuit 108. As illustrated, the sampling circuit may include a divide-by-two portion 202, a synchronizer portion 203, and a differentiator portion 204.

The divide-by-two portion 202 (shown as including flip flop 207 and inverter 206) may receive an input signal 201 (e.g., the sigdet signal discussed above) and reduce the frequency of the input signal 201 by performing a divide by two function. The divide-by-two portion may reduce the frequency of the input signal sufficiently that the reduced frequency input signal may be safely sampled by the clock 109 without bursts or spaces being missed.

The synchronizer portion 203 (shown as including flip flops 208 and 209 driven by the clock 109) may synchronize the reduced frequency input signal with the clock. In other words, the synchronizer portion may sample the reduced frequency input signal into the domain of the clock.

The differentiator portion 204 (shown as including exclusive or gate 211 and flip flop 210 driven by the clock) may generate an activity signal 205 that includes one activity pulse for each state change present in the synchronized input signal in different clock cycles. In other words, the differentiator portion may create an activity signal which is asserted for each clock cycle in which the output of the synchronizer portion changes state from the previous clock cycle. Assertion in consecutive clock cycles may be acceptable, but state changes that correspond to a wakeup signal present in the input signal 201 may change state at most once per clock cycle.

Overall, the sampling circuit 200 may function to change the waveform of the input signal 201 into an activity signal 205 pulse train that is usable for further processing. The activity signal may include one activity pulse for each burst in the input signal.

Although the sampling circuit 200 is illustrated and described as including particular components arranged in a particular order, it is understood that this is an example. In various implementations, various components may be arranged in various orders without departing from the scope of the present disclosure.

For example, the sampling circuit 200 is illustrated and described as including the divide-by-two portion 202. However, in various implementations a different frequency reduction component may be utilized (such as a component that performs a divide by any number N function on the input signal 201, a component that performs a divide by two function on the input signal utilizing other components than the flip flop 207 and the inverter 206, and so on). In some implementations, frequency reduction may be omitted without departing from the scope of the present disclosure.

By way of another example, the synchronizer portion 203 is illustrated and described as including flip flops 208 and 209 driven by the clock 109. However, in various implementations other components may be utilized to synchronize the reduced frequency input signal with the clock without departing from the scope of the present disclosure.

By way of still another example, the differentiator portion 204 is illustrated and described as including exclusive or gate 211 and flip flop 210 driven by the clock 109. However, in various implementations other components may be utilized to generate the activity signal from the synchronized input signal without departing from the scope of the present disclosure.

Figure 3:
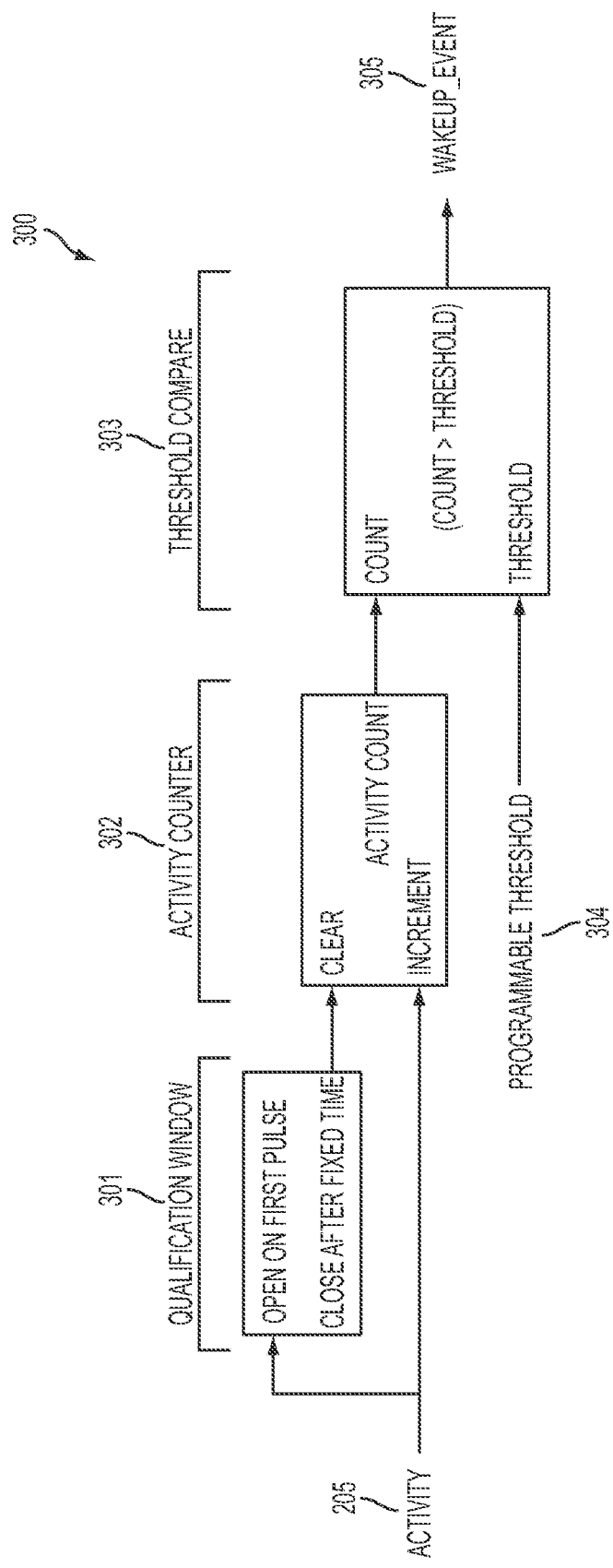
FIG. 3 depicts a simplified block diagram of an example process flow of an example qualification circuit of a wakeup circuit.

FIG. 3 depicts a simplified block diagram of an example process flow 300 of an example qualification circuit that may be used in the wakeup circuit 108. As illustrated, the process flow may include a qualification window portion 301, an activity counter portion 302, and a threshold compare portion 303. In the qualification portion, the activity signal 205 may be processed and a qualification window opened upon the first activity pulse detected in the activity signal. The qualification window may be closed after a period. FIG. 3 is illustrated as using a fixed time (such as a fixed period of time that may be based a number of clock cycles). However, it is understood that this is an example and that any fixed period of time, a user and/or software specified period of time and/or clock cycles, a period of time and/or clock cycles based upon a current frequency of the clock 109, and so on may be utilized without departing from the scope of the present disclosure.

In the activity counter portion 302, an activity counter may be incremented for each activity pulse detected in the activity signal 205 while the qualification window is open. The activity counter may be cleared and/or otherwise set to a zero or base value upon opening of the qualification window.

In the threshold compare portion 303, the current value of the activity counter may be compared against a threshold (which may be fixed, user or system programmable, and so on). If the current value of the activity counter exceeds the threshold (meaning that a number of activity pulses detected during the qualification window are sufficient to indicate that a wakeup signal was present in the input signal 201), a wakeup event may be declared.

As pulses in the input signal 201 corresponding to a wakeup signal would occur within a particular period of time, use of the qualification window may reject at least some noise present in the input signal as a number of intermittent random spikes in the input signal exceeding the threshold would only trigger declaration of a wakeup event if they occurred during the qualification window. Such a number of intermittent random spikes in the input signal exceeding the threshold would not trigger declaration of a wakeup event if they occurred outside of the duration of the qualification window. The duration of the qualification window may correspond to the maximum duration of any wakeup signal that could be present in the input signal (such as between 50 and 78 cycles of the clock 109).

Figure 4A:
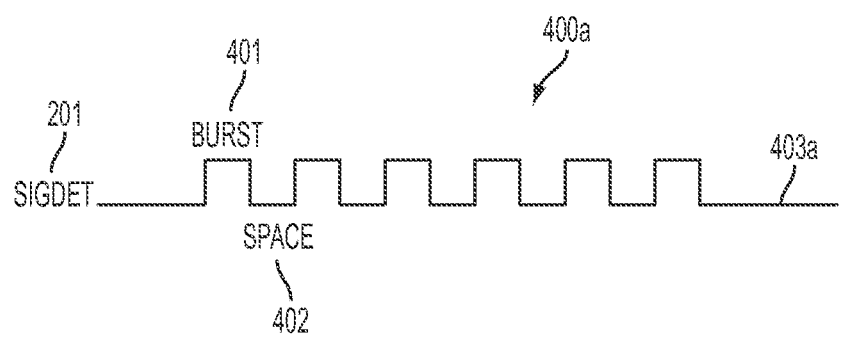
FIG. 4A depicts a diagram of an example input signal including a wakeup signal that may be received by a wakeup circuit.

FIG. 4A depicts a diagram 400*a* of an example input signal 201 including a wakeup signal 403*a* that may be received by the wakeup circuit 108. As illustrated, the wakeup signal 403*a* may include six assertions which may be approximately 106.666 nanoseconds long and negations which may also be 106.666 nanoseconds long.

Figure 4B:
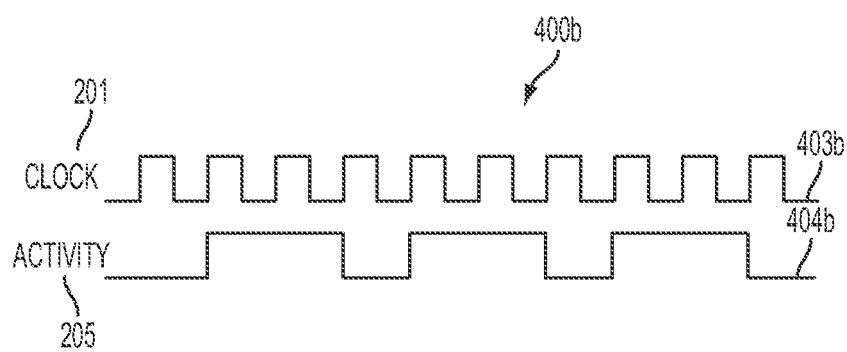
FIG. 4B depicts a diagram of an example input signal including a wakeup signal that may be received by a wakeup circuit and a first example activity signal waveform that the wakeup circuit may generate based on the example input signal using a first clock frequency.

FIG. 4B depicts a diagram 400*b* of an example input signal 201 including a wakeup signal 403*b* that may be received by the wakeup circuit 108 and a first example activity signal 404*b* waveform that the wakeup circuit 108 may generate based on the example input signal using a first clock frequency. Such a first clock frequency may be, by way of example, 7 MHz. As illustrated, the wakeup signal 403*b* may include six assertions which may be approximately 106.666 nanoseconds long and negations which may also be 106.666 nanoseconds long. The illustrated first example activity signal 404*b* waveform may be the waveform that is generated from the wakeup signal 403*b* using the first clock frequency. As illustrated, the six activity pulses in the first example activity signal 404*b* waveform occur in consecutive clock cycles. By utilizing the above discussed techniques, the wakeup circuit 108 may be able to declare a wakeup event by analyzing this first example activity signal 404*b*.

Figure 4C:
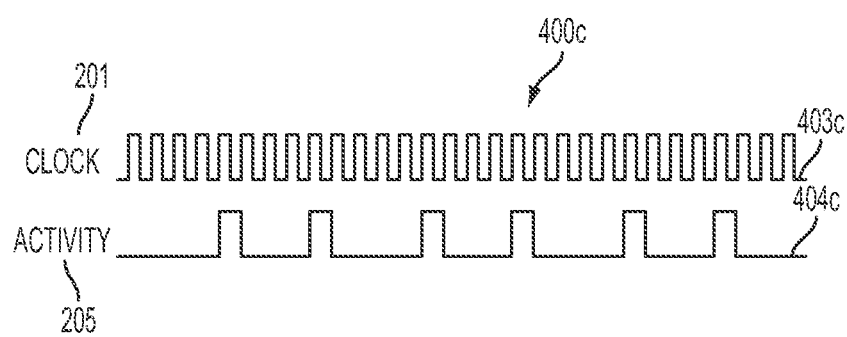
FIG. 4C depicts a diagram of an example input signal including a wakeup signal that may be received by a wakeup circuit and a second example activity signal waveform that the wakeup circuit may generate based on the example input signal using a second clock frequency.

FIG. 4C depicts a diagram 400*c* of an example input signal 201 including a wakeup signal 403*c* that may be received by the wakeup circuit 108 and a second example activity signal waveform that the wakeup circuit 108 may generate based on the example input signal using a second clock frequency. Such a second clock frequency may be, by way of example, 21 MHz. As illustrated, the wakeup signal 403*c* may include six assertions which may be approximately 106.666 nanoseconds long and negations which may also be 106.666 nanoseconds long. The illustrated second example activity signal 404*c* waveform may be the waveform that is generated from the wakeup signal 403*c* using the second clock frequency. As illustrated, the six activity pulses in the second example activity signal 404*c* waveform occur in widely separated clock cycles. By utilizing the above discussed techniques, the wakeup circuit 108 may be also able to declare a wakeup event by analyzing this second example activity signal 404*c*.

Thus the wakeup circuit 108 may be able to utilize clocks 109 that have a range of frequencies within a minimum and a maximum frequency range without requiring configuration for a specific frequency. The wakeup circuit may be configured without knowledge as to exactly what frequency the clock will have. In other words, the wakeup circuit may be able to utilize a clock of an unknown frequency. This may have cost saving benefits since requiring a specific frequency may increase component costs. Conversely, being able to work with different clock frequencies expands integration options and lowers the overall costs of implementation.

In various implementations, the clock 109 may have a period no longer than an envelope of a differential signal detector that generates the input signal 201. This may prevent bursts or spaces from being missed during analysis of the activity signal 205.

Figure 5:
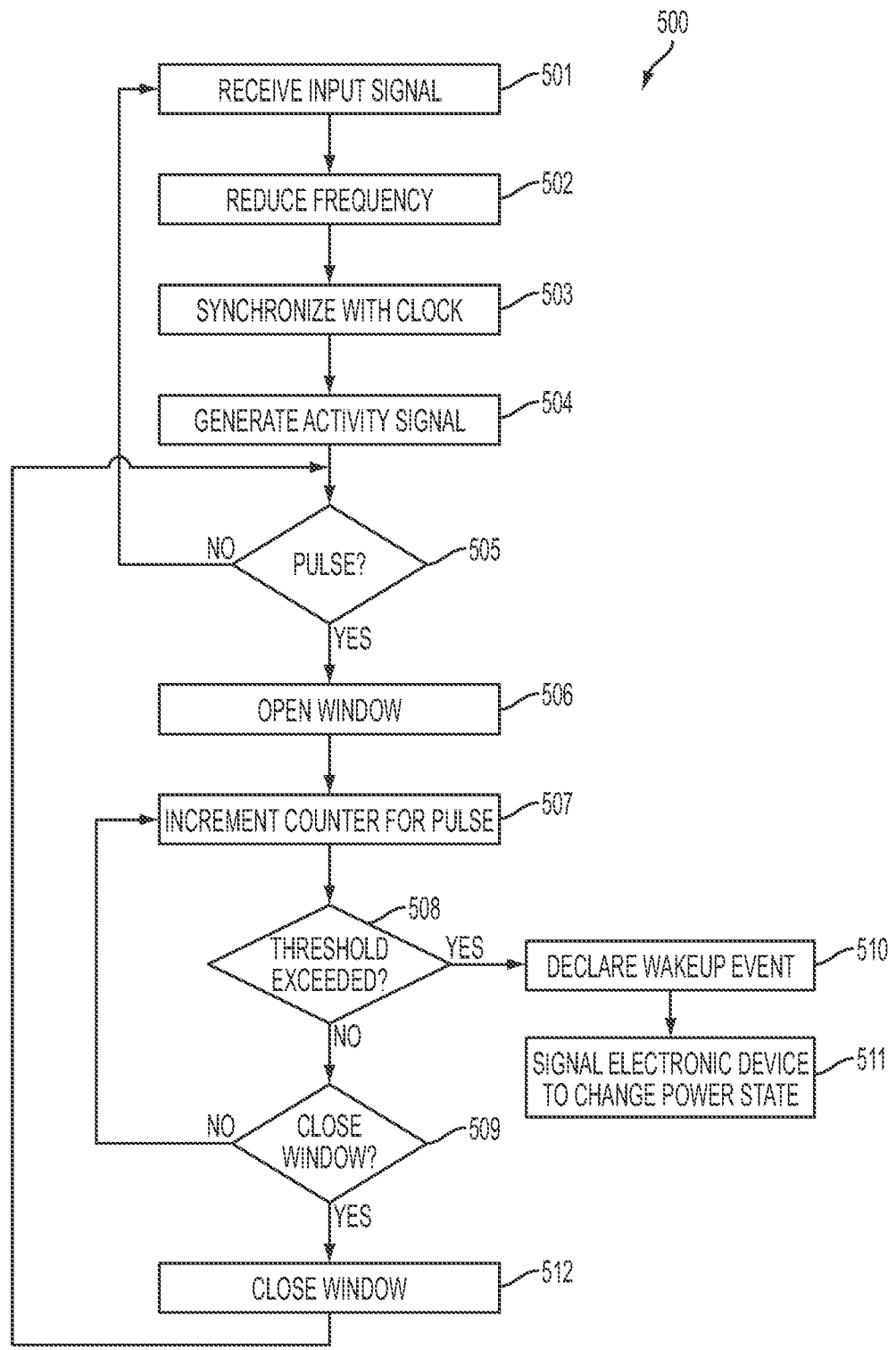
FIG. 5 depicts a flow chart of sample operations of a first example method of operating a wakeup circuit.

FIG. 5 depicts a flow chart of sample operations of a first example method of operating a wakeup circuit. The method may be performed while an electronic device associated with the wakeup circuit is operating in one or more low power states.

At block 501, an input signal may be received. The flow may then proceed to block 502 where the frequency of the input signal may be reduced. Next, the flow may proceed to block 503 where the reduced frequency input signal is synchronized with a clock. The flow may then proceed to block 504 where an activity signal is generated from the synchronized input signal. The generated activity signal may include an activity pulse for each state change present in different clock cycles of the synchronized input signal.

Next, the flow may proceed to block 505 where it may be determined whether or not a first activity pulse is detected in the generated activity signal. If so, the flow may proceed to block 506. Otherwise, processing of the received input signal may continue by the flow returning to block 501 where receipt of the input signal continues.

At block 506, after it is determined whether or not a first activity pulse is detected in the generated activity signal, a qualification window may be opened. The flow may then proceed to block 507 where an activity counter may be incremented for a detected activity pulse in the generated activity signal. The flow may then proceed to block 508 where it may be determined whether the value of the activity counter exceeds a threshold. If so, the flow may proceed to block 510. Otherwise, the flow may proceed to block 509.

At block 509, after it is determined that the value of the activity counter does not exceed the threshold, it may be determined whether or not to close the qualification window. The determination of whether or not to close the qualification window may be based on whether or not a period (such as a fixed period of time and/or clock cycles, a user and/or software specified period of time and/or clock cycles, a period of time and/or clock cycles based upon a current frequency of the clock, and so on) has expired since the qualification window was opened. If so, the flow may proceed to block 512. Otherwise, the flow may return to block 507 where the activity counter may be incremented for the next detected activity pulse in the generated activity signal.

At block 510, after it is determined that the value of the activity counter exceeds the threshold, a wakeup event may be declared. The flow may then proceed to block 511 where the electronic device is signaled to change power state. The power state may change from one or more low power states to a relatively higher power state.

At block 512, after it is determined to close the qualification window, the qualification window is closed. The flow may then return to block 505 where it may be determined whether or not a first activity pulse after closing of the previous qualification window is detected in the generated activity signal.

Although the example method 500 is illustrated and described as including particular operations performed in a particular order, it is understood that this is an example. In various implementations, various orders of the same, similar, and/or different operations may be performed without departing from the scope of the present disclosure. For example, the method is illustrated and described as performing the operations of blocks 501-512 in a linear, sequential fashion. However, it is understood that this is for the sake of clarity. In various implementations, one or more of these operations may be performed simultaneously and/or in other orders and/or sequences than shown. For example, processing of the input signal to generate the activity signal may be performed continuously when operating in a low power state and may be performed while the generated activity signal is being analyzed without departing from the scope of the present disclosure.

Further, although the operations of blocks 508-512 are illustrated and described as declaring a wakeup event if more than the threshold number of activity pulses are detected prior to the closing of the qualification window, it is understood that this is an example. In various implementations, whether or not a wakeup event is declared may be dependent on the clock cycle in which the threshold number of activity pulses are detected. For example, in some implementations a wakeup event may be declared if the final activity pulse for the threshold is detected prior to the clock cycle in which the qualification window will be closed. By way of another example, in various implementations a wakeup event may be declared if the final activity pulse for the threshold is detected in the clock cycle in which the qualification window will be closed. By way of still another example, in some implementations a wakeup event may be declared if the final activity pulse for the threshold is detected in the clock cycle immediately after the clock cycle in which the qualification window is closed. Various configurations are possible and contemplated.

For example, although the method 500 is illustrated and described as declaring a wakeup event if the value of the activity counter exceeds the threshold, it is understood that this is an example. In various implementations, the wakeup event may be declared if a particular pattern of activity pulses is detected in the generated activity signal as opposed to more than a threshold number without departing from the scope of the present disclosure.

Although the wakeup circuit 108 is illustrated in FIG. 1 and described above as being a component of a storage device 105, it is understood that this is an example. In various implementations, the wakeup circuit may be a component of and/or a separate component operable to control any electronic device that is capable of operating in multiple power states.

Figure 6:
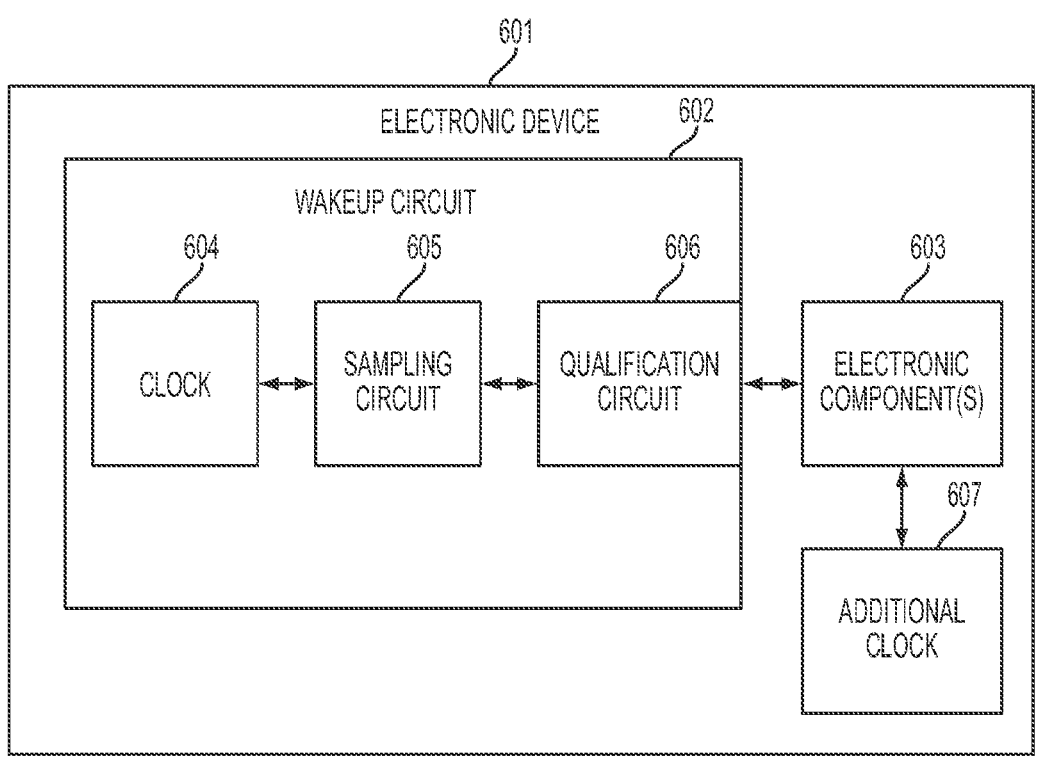
FIG. 6 depicts a simplified block diagram of another example electronic device having a wakeup circuit.

For example, FIG. 6 depicts a simplified block diagram of another example electronic device 601 having a wakeup circuit 602. As illustrated, the wakeup circuit may include a clock 604, a sampling circuit 605, and a qualification circuit 606. The electronic device may include one or more electronic components 603 that are powered in a higher power state and not powered in a lower power state. The wakeup circuit may be operable to sample and process input signals as described above to detect present wakeup signals and declare wakeup events accordingly.

As also illustrated, the electronic device may include one or more additional clocks 607. Such an additional clock may consume more power than the clock 604 and may be active in the higher power state but not active in the lower power state. In some implementations, the additional clock may be a crystal oscillator.

Although the electronic device 601 is illustrated and described as including particular components, it is understood that this is an example. Various components in various configurations may be utilized without departing from the scope of the present disclosure. For example, although the wakeup circuit 602 is shown and described as including distinct sampling circuits 605 and qualification circuits 606, it is understood that in various implementations the wakeup circuit may perform the functions of these circuits without having distinct dedicated circuitry.

Figure 7A:
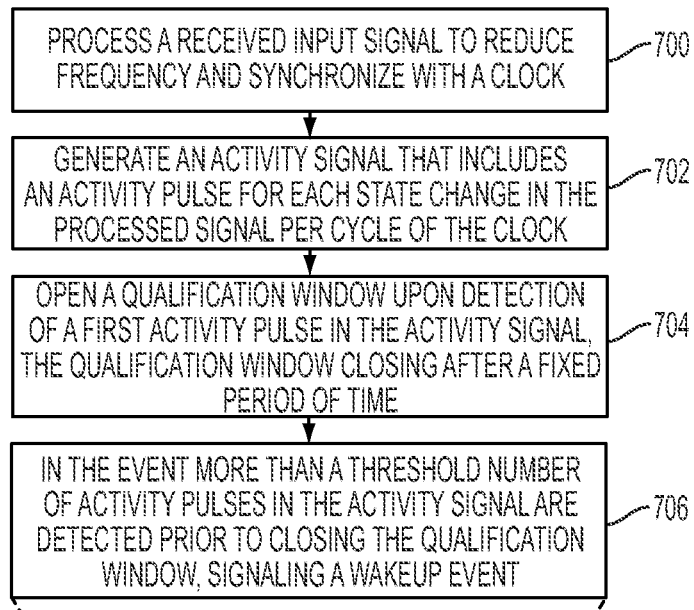
FIG. 7A-7B is a flow chart and block diagram combination that depicts a flow chart of sample operations of a second example method of operating a wakeup circuit.
Figure 7B:
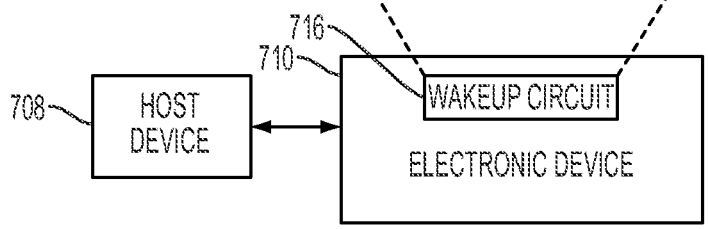

FIG. 7A-7B is a flow chart and block diagram combination that depicts a flow chart of sample operations of a second example method of operating a wakeup circuit. The method of FIG. 7A may begin at operation 700 where a received input signal is processed to reduce the frequency of an input signal and synchronize the reduced frequency input signal with a clock. Next, at operation 702, an activity signal may be generated that includes an activity pulse for each state change in the processed signal per cycle of the clock. Next, at operation 704, a qualification window may be opened upon detection of a first activity pulse in the activity signal. The qualification window may close after a fixed period of time, such as a fixed number of cycles of the clock. Then, at operation 706, a wakeup event may be signaled in the event more than a threshold number of activity pulses are detected prior to closing of the qualification window.

Although the example method of FIG. 7A is illustrated and described as including particular operations performed in a particular order, it is understood that this is an example. In various implementations, various orders of the same, similar, and/or different operations may be performed without departing from the scope of the present disclosure. For example, although the operation 702 is illustrated and described as processing the received input signal to both reduce the frequency and synchronize with the clock, in some implementations the input signal may be processed to synchronize with the clock without reducing frequency.

By way of another example, although the operation 704 is illustrated and described as closing the qualification window after a fixed period of time, in some implementations the period of time may not be fixed. For example, in various implementations the qualification window may be closed based on a period specified by a user or software execution, determined based on determining a current frequency of the clock, and/or other such factors.

In many embodiments, the method of FIG. 7A can be implemented by an electronic device, such as depicted by the simplified block diagram of FIG. 7B. As one example, an electronic device 710 can include a wakeup circuit 716 configured to perform the method of FIG. 7A. In one embodiment, the electronic device can be in the form of a data storage device, and the wakeup circuit 716 can be a part of a processor and/or control circuitry of the data storage device. Such a processor and/or control circuitry can perform or coordinate one or more of the operations of the data storage device. For example, the processor and/or control circuitry can be connected to a voice coil motor ("VCM") that controls the location of a read head and a write head along a rotatable disk that is formed from a magnetic material. The processor and/or control circuitry may also communicate with one or more host devices coupled to the data storage device.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not meant to be exhaustive or to limit the embodiments to the precise forms disclosed. It will be apparent to one of ordinary skill in the art that many modifications and variations are possible in view of the above teachings. In particular, any features described with respect to one embodiment may also be used in some embodiments, where compatible. Likewise, the features of the different embodiments may be exchanged, substituted, or omitted where compatible and appropriate.

Many embodiments of the foregoing disclosure may include or may be described in relation to various methods of operation, use, manufacture, and so on. Notably, the operations of methods presented herein are meant only to be exemplary and, accordingly, are not necessarily exhaustive. For example an alternate operation order, or fewer or additional steps may be required or desired for particular embodiments.

I claim:

1. A wakeup circuit for an electronic device, comprising:
   a clock;
   a sampling circuit, coupled to the clock, configured to:
      synchronize a received input signal with the clock; and
      generate an activity signal that includes an activity pulse for each state change in the synchronized input signal per cycle of the clock; and
   a qualification circuit, coupled to the sampling circuit, configured to:
      open a qualification window upon detection of a first activity pulse in the activity signal;
      in the event more than a threshold number of activity pulses in the activity signal are detected prior to closing the qualification window, declare a wakeup event; and
      close the qualification window.

2. The wakeup circuit of claim 1, the wakeup circuit signals the electronic device to transition from a lower power state to a higher power state upon declaring the wakeup event.

3. The wakeup circuit of claim 2, wherein the electronic device includes an additional clock that is not active during the lower power state.

4. The wakeup circuit of claim 3, wherein the additional clock comprises a crystal oscillator.

5. The wakeup circuit of claim 1, wherein the sampling circuit is further configured to reduce a frequency of the received input signal.

6. The wakeup circuit of claim 5, wherein the sampling circuit comprises a divide circuit that reduces the frequency of the input signal by performing a divide by two function on the input signal.

7. The wakeup circuit of claim 6, wherein the divide circuit comprises a flip flop and an inverter.

8. The wakeup circuit of claim 5, wherein the sampling circuit comprises a divide circuit that reduces the frequency of the input signal by performing a divide by N function on the input signal.

9. The wakeup circuit of claim 1, wherein the sampling circuit comprises flip flops that synchronize the received input signal with the clock.

10. The wakeup circuit of claim 1, wherein the sampling circuit comprises a differentiator circuit configured to generate the activity signal utilizing a flip flop and an exclusive or gate.

11. The wakeup circuit of claim 1, wherein the qualification circuit includes an activity counter that increments an activity count for each activity pulse in the activity signal detected during the qualification window.

12. The wakeup circuit of claim 11, wherein the qualification circuit includes a threshold comparer that determines if the activity count exceeds the threshold number of activity pulses during the qualification window.

13. The wakeup circuit of claim 1, wherein the clock comprises a ring oscillator.

14. A storage device, comprising:
a storage component operable in at least a lower power state and a higher power state; and
a wakeup circuit configured to signal the storage component to transition from the lower power state to the higher power state upon declaration of a wakeup event, the wakeup circuit comprising:
a clock;
a sampling circuit configured to:
process a received input signal to synchronize with the clock; and
generate an activity signal that includes an activity pulse for each time the processed input signal changes state in different cycles of the clock; and
a qualification circuit configured to:
open a qualification window upon detection of a first activity pulse in the activity signal; and
in the event more than a threshold number of activity pulses in the activity signal are detected prior to closing the qualification window, declare a wakeup event.

15. The storage device of claim 14, wherein the clock has an unknown clock frequency.

16. The storage device of claim 14, wherein the sampling circuit is operable to utilize the clock if the clock has a clock frequency within a range of clock frequencies.

17. The storage device of claim 16, wherein the range of clock frequencies comprises 7 megahertz to 29 megahertz.

18. The storage device of claim 14, wherein the qualification circuit is configured to ignore at least some noise in the activity signal.

19. The storage device of claim 14, wherein the processing of the received input signal further comprises reducing a frequency of the received input signal.

20. A method for operating a wakeup circuit for an electronic device, the method comprising:
processing a received input signal to reduce frequency and synchronize with a clock;
generating an activity signal that includes an activity pulse for each state change in the processed signal per cycle of the clock;
opening a qualification window upon detection of a first activity pulse in the activity signal, the qualification window closing after a period of time; and
in the event more than a threshold number of activity pulses in the activity signal are detected prior to closing the qualification window, signaling a wakeup event.

21. The method of claim 20, wherein the period of time is longer than a duration of a wakeup signal present in the received input signal.

22. The method of claim 21, wherein the period of time corresponds to between 50 and 70 cycles of the clock.

23. The method of claim 20, wherein a period of the clock is no longer than an envelope of a differential signal detector that generates the input signal.

24. An electronic device, comprising:
a wakeup circuit configured to:
process a received input signal to reduce frequency and synchronize with a clock;
generate an activity signal that includes an activity pulse for each state change in the processed signal per cycle of the clock;
open a qualification window upon detection of a first activity pulse in the activity signal, the qualification window closing after a period of time; and
in the event more than a threshold number of activity pulses in the activity signal are detected prior to closing the qualification window, signal a wakeup event.

* * * * *